(12) United States Patent
Qin et al.

(10) Patent No.: US 11,218,339 B2
(45) Date of Patent: Jan. 4, 2022

(54) GATEWAY SELECTION METHOD, DEVICE, AND SYSTEM

(71) Applicant: HUAWEI TECHNOLOGIES CO., LTD., Shenzhen (CN)

(72) Inventors: Yun Qin, Shanghai (CN); Ling Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/015,209

(22) Filed: Jun. 22, 2018

(65) Prior Publication Data

US 2018/0302244 A1 Oct. 18, 2018

Related U.S. Application Data

(63) Continuation of application No. PCT/CN2016/111502, filed on Dec. 22, 2016.

(51) Int. Cl.
*H04L 12/66* (2006.01)
*H04L 29/08* (2006.01)
*H04L 12/28* (2006.01)
*H04L 12/46* (2006.01)

(52) U.S. Cl.
CPC .............. *H04L 12/66* (2013.01); *H04L 12/28* (2013.01); *H04L 12/46* (2013.01); *H04L 69/325* (2013.01)

(58) Field of Classification Search
CPC ......... H04L 12/66; H04L 12/28; H04L 12/46; H04L 69/325; H04L 61/2007;
(Continued)

(56) References Cited

U.S. PATENT DOCUMENTS

2008/0317049 A1* 12/2008 Sinicrope ............... H04L 45/28
370/401
2010/0217550 A1* 8/2010 Crabtree ................ H02J 3/005
702/62
(Continued)

FOREIGN PATENT DOCUMENTS

CN 101064678 A 10/2007
CN 101227748 A 7/2008
(Continued)

OTHER PUBLICATIONS

R. Draves et al, Default Router Preferences and More-Specific Routes. RFC4191, Nov. 2005, 15 pages.
(Continued)

*Primary Examiner* — Pao Sinkantarakorn
*Assistant Examiner* — Kabir U Jahangir
(74) *Attorney, Agent, or Firm* — Maier & Maier, PLLC (57) ABSTRACT

A gateway device selection method is provided. The method includes: receiving, by a terminal device, a message from a gateway device, where the message includes identification information of the gateway device, and the identification information of the gateway device indicates information about the gateway device; determining, by the terminal device, that the identification information of the gateway device is consistent with preset identification information of a gateway device on the terminal device, and using the gateway device as a selected gateway device; and sending, by the terminal device, a data packet to the selected gateway device. This helps the terminal device correctly identify the gateway device to which the terminal device is to send data.

10 Claims, 8 Drawing Sheets

(58) Field of Classification Search
CPC ....... H04L 41/12; H04L 67/125; H04L 45/00; H04L 12/6418
See application file for complete search history.

(56) References Cited

U.S. PATENT DOCUMENTS

| | | | |
|---|---|---|---|
| 2012/0179790 A1* | 7/2012 | Kim | H04L 67/22 |
| | | | 709/220 |
| 2013/0094396 A1 | 4/2013 | Johnson | |
| 2016/0065481 A1 | 3/2016 | Zhang | |
| 2017/0265232 A1* | 9/2017 | Miyata | H04W 4/80 |
| 2018/0199274 A1* | 7/2018 | Krishnan | H04W 48/16 |

FOREIGN PATENT DOCUMENTS

| | | |
|---|---|---|
| CN | 101677279 A | 3/2010 |
| CN | 102480772 A | 5/2012 |
| CN | 102917443 A | 2/2013 |
| CN | 105052239 A | 11/2015 |
| CN | 105163349 A | 12/2015 |
| CN | 105791066 A | 7/2016 |
| CN | 105992306 A | 10/2016 |
| EP | 1587291 A2 | 10/2005 |
| WO | 2009017602 A1 | 2/2009 |
| WO | 2010135888 A1 | 12/2010 |
| WO | 2016013979 A1 | 1/2016 |

OTHER PUBLICATIONS

D. Hankins et al, Guidelines for Creating New DHCPv6 Options. R-C7227, May 2014, 35 pages.

R. Droms, Ed. Et al, Dynamic Host Configuration Protocol for IPv6 (DHCPv6). RFC3315, Jul. 2003, 101 pages.

* cited by examiner

| Option name (option name) | Type | RFC |
|---|---|---|
| Source link-layer address (source link-layer address) | 1 | 4861 |
| Target link-layer address (target link-layer address) | 2 | 4861 |
| Prefix information (prefix information) | 3 | 4861 |
| Redirected header (redirected header) | 4 | 4861 |
| MTU (maximum transmission unit) | 5 | 4861 |
| Route information (route information) | 24 | 4191 |
| Router identifier (router identifier, a newly added type in the present invention) | 41 | |

FIG. 4b

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type       |     Length      |             Value         |
+-+-+-+-+-+-+-+-+-+-+-+-+-+-+-+-+-+-+-+-+-+-+-+-+-+-+-+-+-+-+-+-+
```

FIG. 4c

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type    |    Length     |    Subtype    |   Sublength     |
+-+-+-+-+-+-+-+-+-+-+-+-+-+-+-+-+-+-+-+-+-+-+-+-+-+-+-+-+-+-+-+-+
|                           Subdata...                          |
+-+-+-+-+-+-+-+-+-+-+-+-+-+-+-+-+-+-+-+-+-+-+-+-+-+-+-+-+-+-+-+-+
```

GATEWAY SELECTION METHOD, DEVICE, AND SYSTEM

CROSS-REFERENCE TO RELATED APPLICATIONS

This application is a continuation of International Application No. PCT/CN2016/111502, filed on Dec. 22, 2016, the disclosure of which is hereby incorporated by reference in its entirety.

TECHNICAL FIELD

Embodiments of present invention relate to the communications field, and in particular, to a gateway selection method, a device, and a system.

BACKGROUND

With development of various network services and terminal devices, different terminal devices and different types of gateways access a same layer 2 network, and different terminal devices need to use different gateway devices to access different service networks or networks provided by different operators.

Particularly, in recent years, with prosperous development of the Internet of Things (IoT), types of terminal devices (such as a smart electric meter and a smart water meter) are increasing. Correspondingly, different types of service networks are growing. For example, a smart electric meter in a residential community needs to access a service network of a grid company by using a grid gateway device, so as to transmit data of the electric meter to a data center of the grid company for processing. A smart water meter in the residential community needs to access a service network of a water supply company by using a water-network gateway device, so as to transmit data of the smart water meter to a data center of the water supply company for processing. However, when the smart electric meter, the smart water meter, the grid gateway device, and the water-network gateway device access a same layer 2 network, and these terminal devices cannot differentiate information about different gateway devices, the data of the smart electric meter is transmitted after the smart electric meter accesses the service network of the water supply company by using the water-network gateway device, or the data of the smart water meter is transmitted after the smart water meter accesses the service network of the grid company by using the grid gateway device. As a result, a transmission error occurs, and a service is unreachable.

Therefore, when multiple types of terminal devices and multiple types of gateway devices access a same layer 2 network, a terminal device cannot correctly select a gateway device for data transmission.

SUMMARY

A gateway device selection method, a device, and a system provided in embodiments of present invention resolve a problem that a terminal device cannot correctly select a gateway device for data transmission when multiple types of terminal devices and multiple types of gateway devices access a same layer 2 network.

To resolve the foregoing problem, a first aspect of the embodiments of present invention provides a gateway device selection method, where the method includes: receiving, by a terminal device, a message from a gateway device, where the message includes identification information of the gateway device, and the identification information of the gateway device indicates information about the gateway device; determining, by the terminal device, that the identification information of the gateway device is consistent with preset identification information of a gateway device on the terminal device, and using the gateway device as a selected gateway device; and sending, by the terminal device, a data packet to the selected gateway device.

Different gateway devices can be differentiated and identified by setting the identification information of the gateway device, so that the terminal device correctly identifies the gateway device to which the terminal device is to send data.

In a first possible implementation of the first aspect, the identification information of the gateway device includes a service type of a network accessed by the gateway device and/or information about a network to which the gateway device belongs.

Differentiation of gateway devices belonging to different networks and/or supporting different services can be supported by subdividing the identification information of the gateway device, so that gateway device identification is more flexible, and there are more applicable scenarios.

With reference to the first aspect or the first possible implementation of the first aspect, in a second possible implementation of the first aspect, the method further includes: determining, by the terminal device, that the identification information of the gateway device is inconsistent with preset identification information of a gateway device on the terminal device, and identifying the gateway device as a gateway device to which data cannot be sent.

A case in which the identification information of the gateway device is inconsistent with the identification information of the gateway device that is preset on the terminal device can be effectively handled by discarding the message.

With reference to the second possible implementation of the first aspect, in a third possible implementation of the first aspect, the method further includes: the message further carries prefix information, and the terminal device does not need to generate a global unicast IPv6 address of the terminal device according to the prefix information. This prevents the terminal device from storing an unwanted global unicast IPv6 address, thereby saving storage space.

With reference to any one of the first aspect or the first to the third possible implementations of the first aspect, in a fourth possible implementation of the first aspect, the message is a router advertizement (RA) message, the RA message includes an option field, and the option field is used to carry the identification information of the gateway device.

With reference to the fourth possible implementation of the first aspect, in a fifth possible implementation of the first aspect, the option field includes a type type field, a length length field, and a value value field, the type field indicates that a type of the option field advertizes the identification information of the gateway device, the length field indicates a length of the option field or a length of the value field, and the value field indicates the identification information of the gateway device.

The option field in the RA message is extended and a TLV format is used, so that it is simple and efficient to implement carrying of the identification information of the gateway device.

With reference to the fifth possible implementation of the first aspect, in a sixth possible implementation of the first aspect, the value field includes at least one subvalue field, each subvalue field includes a subtype field, a sublength field, and a subdata field, the subtype field indicates that the identification information of the gateway device is the service type of the network accessed by the gateway device or the information about the network to which the gateway device belongs, the sublength field indicates a length of the subvalue field or a length of the subdata field, and the subdata field indicates a value of the service type of the network accessed by the gateway device or a value of the information about the network to which the gateway device belongs.

Various types of identification information of the gateway device can be flexibly carried in various application scenarios by extending a subvalue format of the option field in the RA message, so that a user customizes, according to a requirement, an identifier of the gateway device and carries out related services.

A second aspect of the embodiments of present invention provides a message sending method, where the method includes: obtaining, by the gateway device, identification information of the gateway device, where the identification information of the gateway device indicates information about the gateway device; and sending, by the gateway device, a message to the terminal device, where the message includes the identification information of the gateway device.

Different gateway devices can be differentiated and identified by setting the identification information of the gateway device, so as to facilitate correct identification of the gateway device.

In a first possible implementation of the second aspect, the identification information of the gateway device includes a service type of a network accessed by the gateway device and/or information about a network to which the gateway device belongs.

Differentiation of gateway devices belonging to different networks and/or supporting different services can be supported by subdividing the identification information of the gateway device, so that gateway device identification is more flexible, and there are more applicable scenarios.

With reference to the second aspect or the first possible implementation of the second aspect, in a second possible implementation of the second aspect, before the sending, by the gateway device, a message to the terminal device, the method further includes: receiving, by the gateway device, a router solicitation RS message from the terminal device.

With reference to any one of the second aspect or the first and the second possible implementations of the second aspect, in a third possible implementation of the second aspect, the message is a router advertizement (RA) message, the RA message includes an option field, and the option field is used to carry the identification information of the gateway device.

The identification information of the gateway device is carried in the RA message, so that advertizement of the identification information of the gateway device can be implemented in the embodiments of present invention by effectively using an existing protocol.

With reference to the third possible implementation of the second aspect, in a fourth possible implementation of the second aspect, the option field includes a type type field, a length length field, and a value value field, the type field indicates that a type of the option field advertizes the identification information of the gateway device, the length field indicates a length of the option field or a length of the value field, and the value field indicates the identification information of the gateway device.

The option field in the RA message is extended and a TLV format is used, so that it is simple and efficient to implement carrying of the identification information of the gateway device.

With reference to the fourth possible implementation of the second aspect, in a fifth possible implementation of the second aspect, the value field includes at least one subvalue subvalue field, each subvalue field includes a type subtype field, a sublength sublength field, and a subdata subdata field, the subtype field indicates that the identification information of the gateway device is the service type of the network accessed by the gateway device or information about the network to which the gateway device belongs, the sublength field indicates a length of the subvalue field or a length of the subdata field, and the subdata field indicates a value of the service type of the network accessed by the gateway device or a value of the information about the network to which the gateway device belongs.

Various types of identification information of the gateway device can be flexibly carried in various application scenarios by extending a subvalue format of the option field in the RA message, so that a user customizes, according to a requirement, an identifier of the gateway device and carries out related services/services.

According to a third aspect, the application provides a terminal device. The terminal device is configured to perform the method in the first aspect or any possible implementation of the first aspect. Specifically, the terminal device includes a module configured to perform the method in the first aspect or any possible implementation of the first aspect.

According to a fourth aspect, the application provides a terminal device. The terminal device includes a processor, a transmitter, a random access memory, a read-only memory, and a bus. The processor is coupled to the transmitter, the random access memory, and the read-only memory by using the bus. When a terminal device needs to be run, the terminal device is started by using a basic input/output system built in the read-only memory or by using a bootloader boot system in an embedded system, to boot the terminal device to a normal running state. After the terminal device enters a normal running state, an application and an operating system run in the random access memory, so that the processor performs the method in the first aspect or any possible implementation of the first aspect.

According to a fifth aspect, the application provides a computer readable medium. The computer readable medium is configured to store a computer program, and the computer program includes an instruction used to perform the method in the first aspect or any possible implementation of the first aspect.

According to a sixth aspect, the application provides a gateway device. The gateway device is configured to perform the method in the second aspect or any possible implementation of the second aspect. Specifically, the gateway device includes a module configured to perform the method in the second aspect or any possible implementation of the second aspect.

According to a seventh aspect, the application provides a gateway device. The gateway device includes a processor, a transmitter, a random access memory, a read-only memory, and a bus. The processor is coupled to all of the transmitter, the random access memory, and the read-only memory by using the bus. When it is required to run a terminal device, starting is performed by using a basic input/output system built in the read-only memory or by using a bootloader boot system in an embedded system, to boot the terminal device to a normal running state. After the terminal device enters a normal running state, an application and an operating system run in the random access memory, so that the processor performs the method in the second aspect or any possible implementation of the second aspect.

According to an eighth aspect, a gateway device is provided. The gateway device includes a main control board and an interface board and may further include a switching board. The gateway device is configured to perform the method in the second aspect or any possible implementation of the second aspect. Specifically, the gateway device includes a module configured to perform the method in the second aspect or any possible implementation of the second aspect.

According to a ninth aspect, the application provides a computer readable medium. The computer readable medium is configured to store a computer program, and the computer program includes an instruction used to perform the method in the second aspect or any possible implementation of the second aspect.

According to a tenth aspect, a system is provided. The system includes the terminal device according to any one of the third aspect to the fifth aspect and the gateway device according to any one of the sixth aspect to the ninth aspect.

BRIEF DESCRIPTION OF DRAWINGS

To describe the technical solutions in the embodiments of present invention or in the prior art more clearly, the following briefly describes the accompanying drawings required for describing the embodiments. Apparently, the accompanying drawings in the following description merely show some embodiments of present invention, and a person of ordinary skill in the art can derive other implementations from these accompanying drawings without creative efforts. All these embodiments or implementations shall fall within the protection scope of the application.

DESCRIPTION OF EMBODIMENTS

The technical solutions according to embodiments of present invention are clearly described in the following with reference to the accompanying drawings. Apparently, the described embodiments are merely some but not all of the embodiments of present invention. All other embodiments obtained by a person of ordinary skill in the art based on the embodiments of present invention without creative efforts shall fall within the protection scope of the application.

Network architectures and service scenarios described in the embodiments of present invention are used to describe technical solutions in the embodiments of present invention more clearly, and do not constitute limitations on the technical solutions in the embodiments of present invention. A person of ordinary skill in the art may know that with evolution of network architectures and emergence of new service scenarios, the technical solutions provided in the embodiments of present invention are also applicable to similar technical problems.

Figure 1:
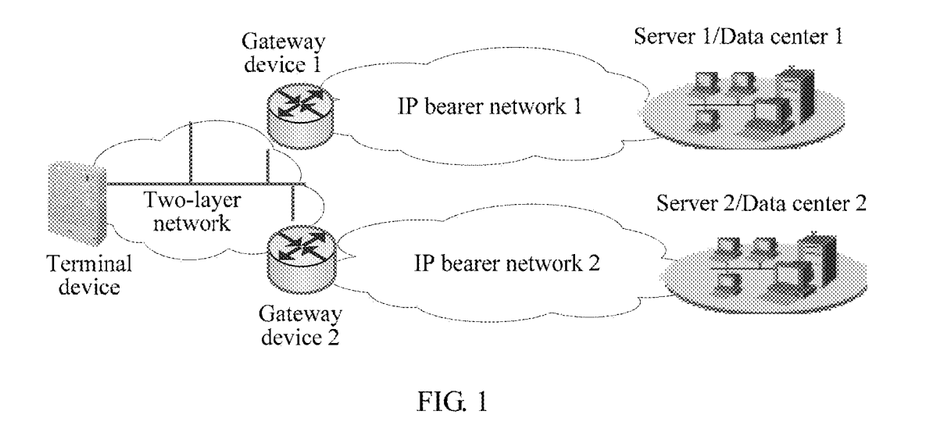
FIG. 1 is a schematic diagram of a network according to an embodiment of the application.

As shown in FIG. 1, a terminal device, a gateway device 1, and a gateway device 2 are deployed in a same layer 2 work. The terminal device can access an IP bearer network 1 by using the gateway device 1, so as to access a service of a data center 1. The terminal device can access an IP bearer network 2 by using the gateway device 2, so as to access a service of a data center 2.

The terminal device in this application is a start or termination node that supports an Internet Protocol version 6 (IPv6) protocol. For example, the terminal device may be a base station on a mobile network, or a PC, a portable computer, or a pad on a broadband access network, or various sensors, an IoT gateway, or the like on an IoT network. The layer 2 network in this application is an access network, and used by the terminal device to access an IP bearer network by using a gateway. For example, the layer 2 network may be broadcast Ethernet. The IP bearer network in this application is a transport network that supports the IP protocol and is used to transmit, to a server end, for example, a server or a server on a data center network, a packet sent by the terminal device. The IP bearer network may be an IP metropolitan area network or an IP backbone network. The gateway device in this application may be a network device that supports the IPv6 protocol, such as a router and a switch.

Figure 2A:
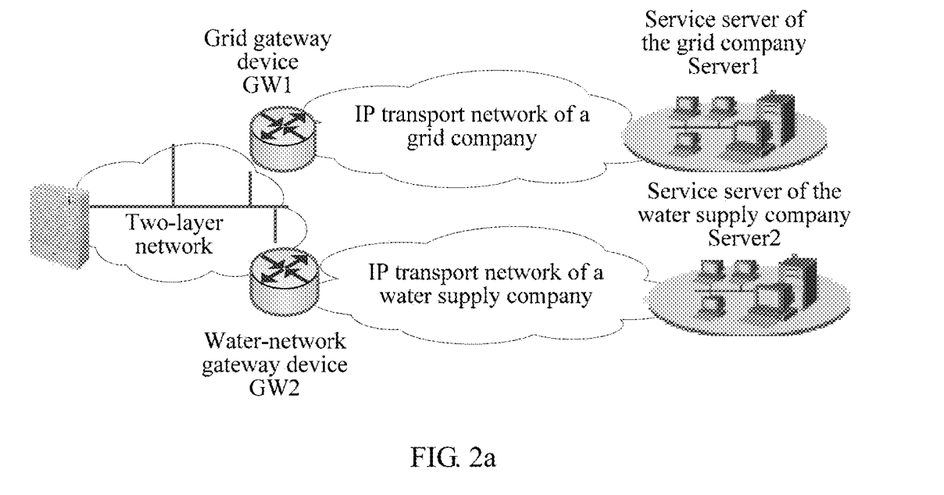
FIG. 2a is a schematic network diagram of an application to the Internet of Things according to an embodiment of the application.

FIG. 2a shows an application scenario on the Internet of Things according to an embodiment of the application. The Internet of Things (IoT) is a network on which an information carrier such as the Internet or a conventional telecommunications network implements interworking between all common objects that can each implement an independent function. A terminal device (for example, a smart electric meter) on the IoT network accesses a layer 2 network, and accesses a transport network of a grid company by using a grid gateway device on the layer 2 network, so as to transmit data to a data center or a service enter of the grid company, so that data of the smart electric meter is transmitted to a service platform (for example, grid-related service software running on a server) of the grid company. However, on the layer 2 network, there may further be a water-network gateway device, which is used by a smart water meter that is used as a terminal device for accessing a transport network of a water supply company, so as to access a service platform (for example, water-network-related service software running on a server) of the water supply company. Because a smart electric meter and a smart water meter that are of a community resident, the grid gateway device, and the water-network gateway device access the same layer 2 network, the smart electric meter may incorrectly select the water-network gateway device for data transmission. As a result, a transmission error occurs, and a service is unreachable. In addition, the smart electric meter further generates a global unicast IPv6 address (Global IPv6 Address) according to a message that includes an IPv6 prefix and that is sent by the water-network gateway device, but the global IPv6 address is not used. As a result, storage space of the smart electric meter is wasted.

Figure 2B:
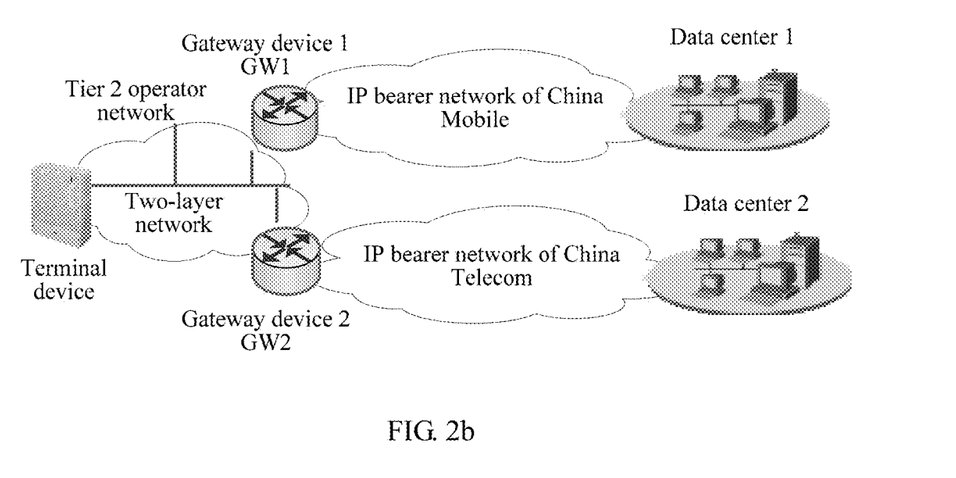
FIG. 2b is a schematic network diagram of an application to a tier 2 operator network according to an embodiment of the application.

FIG. 2b shows another application scenario in a tier 2 operator network according to an embodiment of the application. A tier 2 operator is a vendor who does not have an infrastructure network but performs basic telecommunication services or telecommunication value-added services. By leasing a network facility or a network product of a basic telecommunication operator such as China Telecom and China Mobile, the tier 2 operator provides various telecommunication value-added services to users in a service agent or service distribution manner. Therefore, the tier 2 operator needs to flexibly select gateway devices of different operators according to factors such as different tariffs provided by different operators, to allow users' terminal devices of the operator to access different IP bearer networks. For example, if a tariff of China Mobile is cheaper than that of China Telecom, a gateway device 1 is selected to transmit a data packet from a user's terminal device. However, because the user's terminal device, the gateway device 1, and a gateway device 2 access a same layer 2 network, the user's terminal device may incorrectly select the gateway device 2 for data transmission. As a result, a transmission error occurs, and a service is unreachable. It should be noted that in addition to a tier 2 operator, this scenario may also be applicable to another enterprise who needs to lease a basic telecommunication operator network, for example, a company providing Internet services, such as Tencent. In addition, the terminal device further generates a global IPv6 address according to a message that includes an IPv6 prefix and that is sent by the gateway device 2, but the global IPv6 address is not used. As a result, storage space of the terminal device is wasted.

Figure 2C:
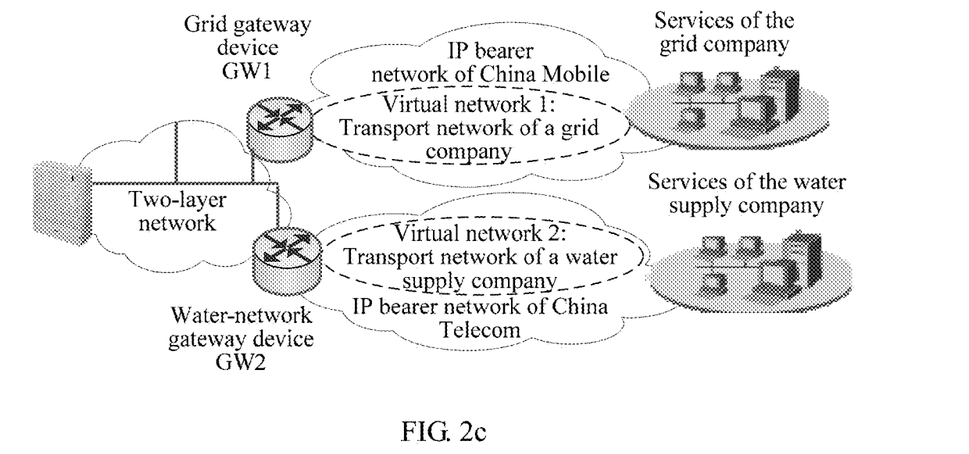
FIG. 2c is a schematic network diagram of still another application to the Internet of Things according to an embodiment of the application.

FIG. 2c shows still another application scenario on the Internet of Things according to an embodiment of the application. This scenario is similar to that shown in FIG. 2a, except that a transport network of a grid company and a transport network of a water supply company are not independent dedicated transport networks, but networks that lease a basic telecommunication operator network for transmission. For example, a virtualization technology, a virtual private network (VPN) technology, or a like technology may be used to obtain, by division or slicing, two independent virtual networks or virtual private lines from a public telecommunication packet transport network provided by a basic telecommunication operator. Two virtual networks are independent from each other and are maintained by the grid company and the water supply company, respectively. A smart electric meter of the grid company accesses, by using a grid gateway device provided by the operator China Mobile, a virtual network 1 (that is, a transport network of the grid company) provided by the operator China mobile, so as to transmit data to a data center or a service center of the grid company. Because a smart electric meter and a smart water meter that are of a community resident, the grid gateway device and a water-network gateway device access a same layer 2 network, the smart electric meter may incorrectly select the water-network gateway device provided by the operator China Telecom to access a virtual network 2 (that is, a transport network of the water supply company) provided by the operator China Telecom for data transmission. As a result, a transmission error occurs, and a service is unreachable. In addition, the smart electric meter further generates a global unicast IPv6 address (Global IPv6 Address) according to a message that includes an IPv6 prefix and that is sent by the water-network gateway device provided by the operator China Telecom, but the global IPv6 address is not used. As a result, storage space of the smart electric meter is wasted.

The foregoing describes several possible application scenarios in the application. Based on this, the following further describes the embodiments of present invention in detail.

Figure 3:
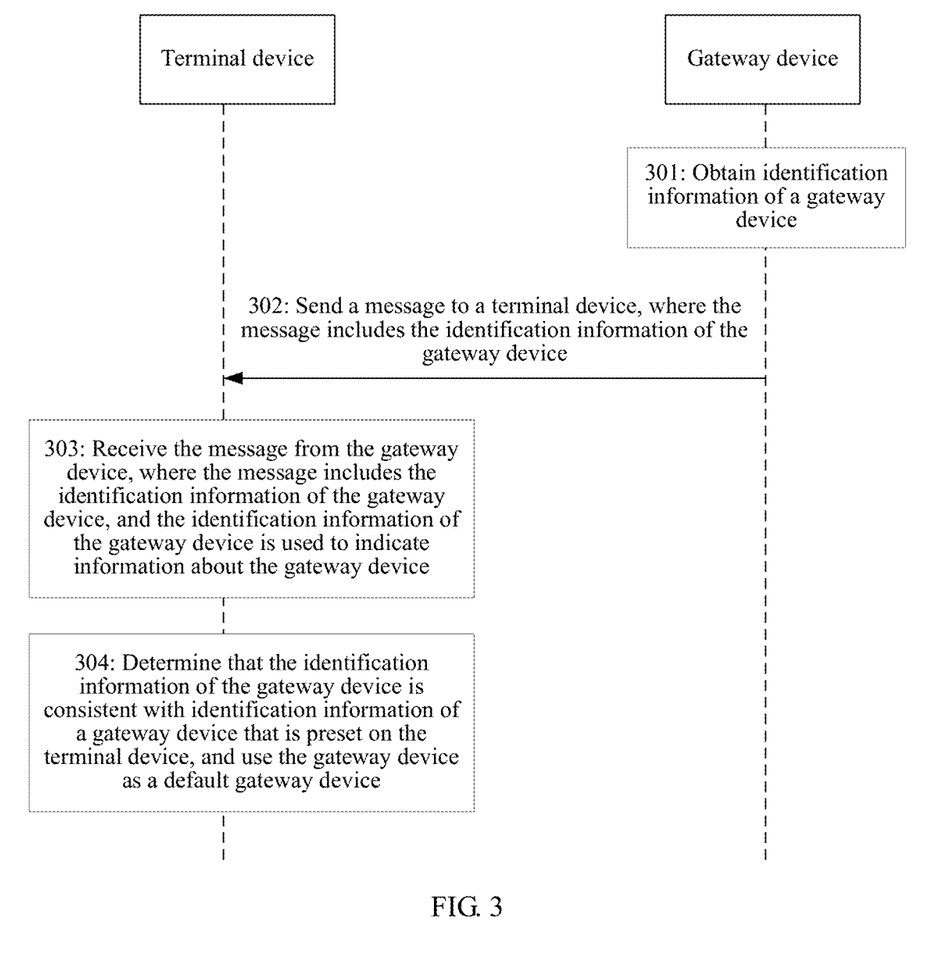
FIG. 3 is a schematic flowchart of interaction of a gateway device selection method according to an embodiment of the application.

FIG. 3 is a schematic flowchart of a gateway device selection method according to an embodiment of the application. The method is applied to a scenario, as shown in FIG. 1, in which multiple types of terminal devices and multiple types of gateway devices are deployed in a same layer 2 network. Specifically, the method may be applied to the three network scenarios shown in FIG. 2a, FIG. 2b, and FIG. 2c.

A solution provided in this embodiment of the application includes part 301, part 302, part 303, and part 304. Part 301 and part 302 are performed on a gateway device, and part 303 and part 304 are performed on a terminal device. The following separately provides descriptions.

In part 301, the gateway device obtains identification information of the gateway device, where the identification information of the gateway device indicates information about the gateway device.

The identification information of the gateway device includes a service type of a network accessed by the gateway device and/or information about a network to which the gateway device belongs. For example, in the scenario shown in FIG. 2a, identification information of a gateway device includes a service type of a network accessed by the gateway device, that is, identification information of a grid gateway device GW1 is a smart grid service, and identification information of a water-network gateway device GW2 is a smart water-network service. In the scenario shown in FIG. 2b, identification information of a gateway device includes information about a network to which the gateway device belongs, that is, identification information of a gateway device GW1 is a network that belongs to the operator China Mobile, and identification information of a gateway device GW2 is a network that belongs to the operator China Telecom. In the scenario shown in FIG. 2c, identification information of a gateway device includes information about a network to which the gateway device belongs and a service type of a network accessed by the gateway device, that is, identification information of a gateway device GW1 includes a network that belongs to the operator China Mobile and a smart grid service, and identification information of a gateway device GW2 includes a network that belongs to the operator China Telecom and a smart water-network service. Differentiation of gateway devices belonging to different networks and/or supporting different services can be supported by subdividing the identification information of the gateway device, so that gateway device identification is more flexible, and there are more applicable scenarios.

A manner of obtaining the identification information of the gateway device by the gateway device may include but is not limited to the following several manners:

Manner 1: A network administrator preplans the identification information of the gateway device and configures the identification information of the gateway device on the gateway device by using a command line. An example of specific configuration information is consistent with the identification information of the gateway device in the scenarios shown in FIG. 2a, FIG. 2b, and FIG. 2c. Details are not described herein again.

Manner 2: The gateway device receives a message sent by another control management device, where the message carries the identification information of the gateway device. The gateway device performs configuration according to the identification information of the gateway device that is carried in the message. For example, the gateway device may receive a management message from a management device by using a network management protocol, and configure the identification information of the gateway device. The network management protocol may be the Simple Network Management Protocol (SNMP), the Network Configuration Protocol (NETCONF), or the like. This is not limited herein. The gateway device may alternatively receive a control message from a controller by using a control channel protocol, and configure the identification information of the gateway device. The control channel protocol may be the OpenFlow protocol, the Path Computation Element Communication Protocol (PCEP), the Border Gateway Protocol (BGP), the Interface to the Routing System (I2RS), or the like. This is not limited herein.

Manner 3: During development of software running on the gateway device, a default value of the identification information of the gateway device is preset in software code, for example, a network that belongs to the operator China Telecom.

Manner 4: The gateway device itself runs an algorithm of generating identification information of the gateway device, automatically generates the identification information (for example, a smart grid service) of the gateway device according to the algorithm by using software, and completes configuration according to the generated identification information of the gateway device.

Gateway devices belonging to different networks or supporting different services can be differentiated and identified by setting the identification information of the gateway device, so that the gateway device is correctly identified by the terminal device.

In part 302, the gateway device sends a message to the terminal device, where the message includes the identification information of the gateway device.

Optionally, the message may be a router advertizement (RA) message. A case in which the gateway device sends the RA message to the terminal device includes but is not limited to the following two cases.

Case 1: When the terminal device accesses a layer 2 network on which the gateway device already exists, after being started, the terminal device sends a router solicitation (RS) message to the gateway device. The RS message is used to learn configuration information of the gateway device. After receiving the RS message, the gateway device advertizes the RA message on the layer 2 network. The RA message includes the identification information of the gateway device.

Case 2: When the gateway device is just deployed (that is, newly added) onto a layer 2 network, the gateway device proactively sends the RA message to the terminal device to advertize configuration information of the gateway device. The RA message includes the identification information of the gateway device.

The identification information of the gateway device is carried in the RA message, so that advertizement of the identification information of the gateway device can be implemented in this embodiment of the application by effectively using an existing protocol.

Figure 4A:
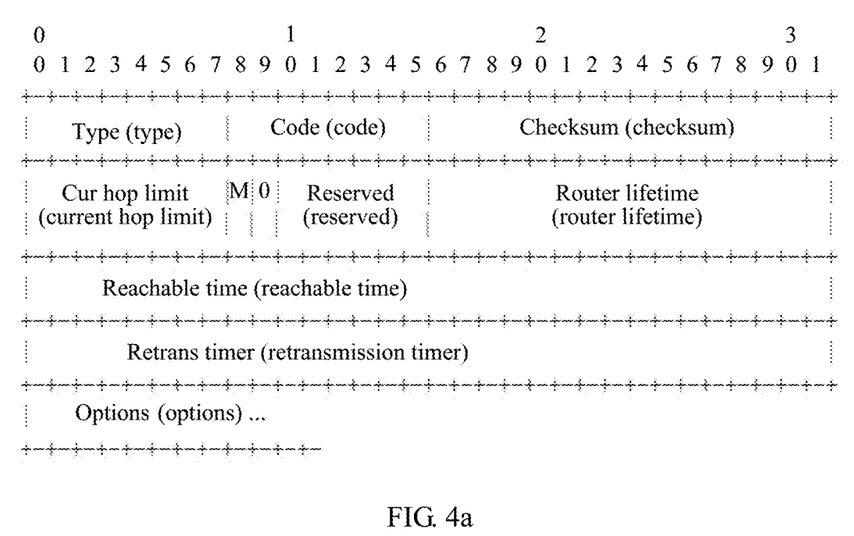
FIG. 4a is a schematic diagram of a format of an RA message according to an embodiment of the application.
Figure 4B:
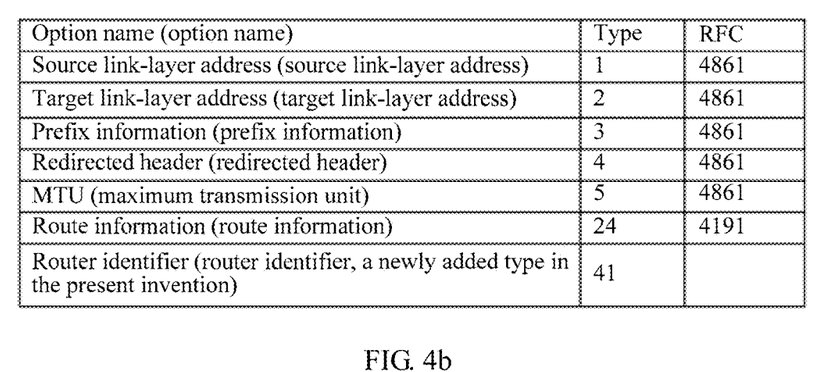
FIG. 4b is a schematic diagram of a type of an option field according to an embodiment of the application.

Further, optionally, for a format that is of the RA message and shown in FIG. 4a, refer to the Request For Comments (RFC) 4191 released by the Internet Engineering Task Force (IETF). Content related to this part in this document is incorporated herein by reference in its entirety. For brevity, details are not described again. In this embodiment of the application, an option field in the RA message is extended, and the identification information of the gateway device is carried by adding one type of option field in the RA message. FIG. 4b shows an example of the type of the option field. The last row is a type newly added in the application, and is a router identifier, used to indicate advertizement of the identification information of the gateway device. A type value may be a value newly allocated by the Internet Assigned Numbers Authority (IANA). For example, the value may be 41. This is merely an example herein, and no limitation is set thereto. In FIG. 4b, option types other than the last row are some types already defined in an existing standard draft. For details, refer to a corresponding RFC definition, and details are not described. For example, an option name is an option field of a source link-layer address whose type is 1, and is specifically defined in the RFC 4861.

The option field in the RA message is extended and a TLV format is used, so that it is simple and efficient to implement carrying of the identification information of the gateway device.

Figure 4C:
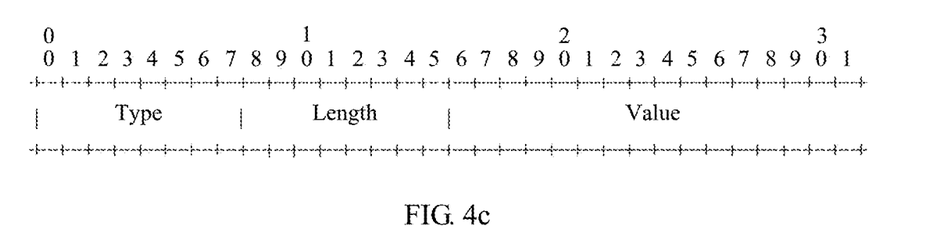
FIG. 4c is a schematic diagram of a format of an option field according to an embodiment of the application.

Further, optionally, as shown in FIG. 4c, the foregoing option field used to carry the identification information of the gateway device may specifically include a type field, a length field, and a value field. The type field indicates that a type of the option field advertizes the identification information of the gateway device, the length field indicates a length of the option field or a length of the value field, and the value field indicates the identification information of the gateway device. For example, if a value of the type field is 41, a corresponding option name in FIG. 4b is a newly added type, that is, a router identifier, indicating advertizement of the identification information of the gateway device.

Figure 4D:
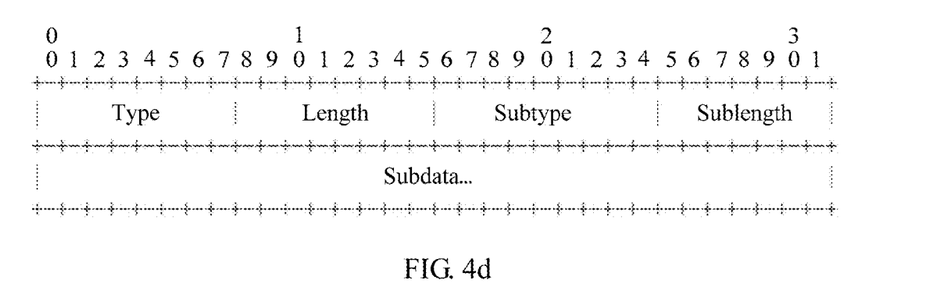
FIG. 4d is a schematic diagram of a detailed format of an option field according to an embodiment of the application.

Further, optionally, the value field may include at least one subvalue field, and each subvalue field includes a subtype field, a sublength field, and a subdata field. The subtype field indicates that the identification information of the gateway device is a service type of a network accessed by the gateway device or information about a network to which the gateway device belongs, the sublength field indicates a length of the subvalue field or a length of the subdata field, and the subdata field indicates a value of the service type of the network accessed by the gateway device or a value of the information about the network to which the gateway device belongs. As shown in FIG. 4d, descriptions of the type field and the length field are consistent with those in FIG. 4c, and details are not described again. A value of the subtype may range from 1 to 255. An example of a specific definition is as follows:

When a value of the subtype is 1, the value represents a service type, that is, a service type of a network accessed by the gateway device. Correspondingly, the subdata is user-defined data, and is used to identify a specific service type. For example, 1 represents a smart grid service, 2 represents a smart water-network service, and 3 represents a smart traffic service.

When a value of the subtype is 2, the value represents an operator identifier, that is, information about a network to which the gateway device belongs. Correspondingly, the subdata is user-defined data, and is used to identify a specific basic telecommunication operator. For example, 1 represents the operator China Telecom, 2 represents the operator China Mobile, and 3 represents the operator China Unicom.

When a value of a subtype 1 ranges from 3 to 255, the value is reserved and may be used for future extension according to a service requirement.

It should be noted that according to different network deployment and service requirements, the value field may carry one subvalue or carry two or three or more subvalues. For example, in the scenario shown in FIG. 2a or FIG. 2b, the value field in the RA message sent by the GW1 needs to carry only one subvalue, that is, carry a service type (for example, 1: a smart grid service) or an operator identifier (for example, 2: the operator China Mobile). In the scenario shown in FIG. 2c, the value field in the RA message sent by the GW1 needs to carry two subvalues, that is, carry a service type (for example, 1: a smart grid service) and an operator identifier (for example, 2: the operator China Mobile), respectively.

Various types of identification information of the gateway device can be flexibly carried in various application scenarios by extending a subvalue format of the option field in the RA message, so that a user customizes, according to a requirement, an identifier of the gateway device and carries out related services/services.

In part 303, the terminal device receives the message from the gateway device, where the message includes the identification information of the gateway device. Descriptions of the identification information of the gateway device are consistent with those in part 301, and details are not described again.

In part 304, the terminal device determines that the identification information of the gateway device is consistent with preset identification information of a gateway device on the terminal device, and uses the gateway device as a selected gateway device. When sending a data packet subsequently, the terminal device forwards the data packet to the selected gateway device and correctly accesses an IP transport network by using the selected gateway device.

The selected gateway device may also be used as a default gateway device. When the terminal device cannot find an available gateway device, the terminal device sends the data packet to the default specified gateway device, and the default gateway device processes the data packet.

Further, the message further carries IPv6 prefix information. The terminal device may generate a global unicast IPv6 address of the terminal device according to the IPv6 prefix information.

A manner in which the identification information of the gateway device is preset on the terminal device is similar to the manner in part 301 in which the gateway device obtains the identification information of the gateway device, except that the identification information of the gateway device is configured on the terminal device. It should be noted that in any one of Manners 1 to 4, it is required to ensure that the identification information of the gateway device configured on the terminal device is consistent (that is, identical) with that configured on the gateway device. For example, corresponding to Manner 3 for the gateway device, during development of software running on the terminal device, a default value that is of the identification information of the gateway device and that is set in software code needs to be consistent with that set on the gateway device. Corresponding to Manner 4 for the gateway device, the algorithm that is of generating the identification information of the terminal device and that is run by the terminal device itself needs to be consistent with an algorithm that is run on the gateway device, and identical identification information of the gateway device can be generated in a same condition.

Different gateway devices can be differentiated and identified by setting the identification information of the gateway device, so that the terminal device correctly identifies the gateway device to which the terminal device is to send data.

Optionally, when determining that the identification information of the gateway device is inconsistent with preset identification information of a gateway device on the terminal device, the terminal device identifies the gateway device as a gateway device to which data cannot be sent, and the terminal device may discard the message.

A case in which the identification information of the gateway device is inconsistent with the identification information of the gateway device that is preset on the terminal device can be effectively handled by discarding the message.

Further, optionally, the terminal device does not need to generate a global unicast IPv6 address of the terminal device according to the IPv6 prefix information. This prevents the terminal device from storing an unwanted global unicast IPv6 address, thereby saving storage space.

In the scenario shown in FIG. 2a, the identification information of the gateway device that is preset on the terminal device is a smart grid service. When the identification information of the gateway device that is carried in the RA message received by the terminal device from the GW1 is a smart grid service, the terminal device uses the GW1 as a selected gateway device. When the identification information of the gateway device that is carried in the RA message received by the terminal device from the GW2 is a smart water-network service, the terminal device determines that the identification information of the gateway device is inconsistent with the identification information of the gateway device that is preset on the terminal device, identifies the gateway device as a gateway device to which data cannot be sent (that is, the GW2 is not used as the selected gateway device), and may discard the message.

In the scenario shown in FIG. 2b, the identification information of the gateway device that is preset on the terminal device is the operator China Mobile. When the identification information of the gateway device that is carried in the RA message received by the terminal device from the GW1 is the operator China Mobile, the terminal device uses the GW1 as a selected gateway device. When the identification information of the gateway device that is carried in the RA message received by the terminal device from the GW2 is the operator China Telecom, the terminal device determines that the identification information of the gateway device is inconsistent with the identification information of the gateway device that is preset on the terminal device, identifies the gateway device as a gateway device to which data cannot be sent, and may discard the message.

In the scenario shown in FIG. 2c, the identification information of the gateway device that is preset on the terminal device is the operator China Mobile and a smart grid service. When the identification information of the gateway device that is carried in the RA message received by the terminal device from the GW1 includes the operator China Mobile and the smart grid service, the terminal device uses the GW1 as a selected gateway device. When the identification information of the gateway device that is carried in the RA message received by the terminal device from the GW2 includes the operator China Telecom and a smart water-network service, the terminal device determines that the identification information of the gateway device is inconsistent with identification information of the gateway device that is preset on the terminal device, identifies the gateway device as a gateway device to which data cannot be sent, and may discard the message. Optionally, in this case, determining is performed twice. The terminal device first determines whether the operator identifiers are consistent. If the operator identifiers are consistent, the terminal device further determines whether the service types are consistent. Similarly, a reverse determining order may be used. The terminal device first determines whether the service types are consistent. If the service types are consistent, the terminal device further determines whether the operator identifiers are consistent.

Figure 5A:
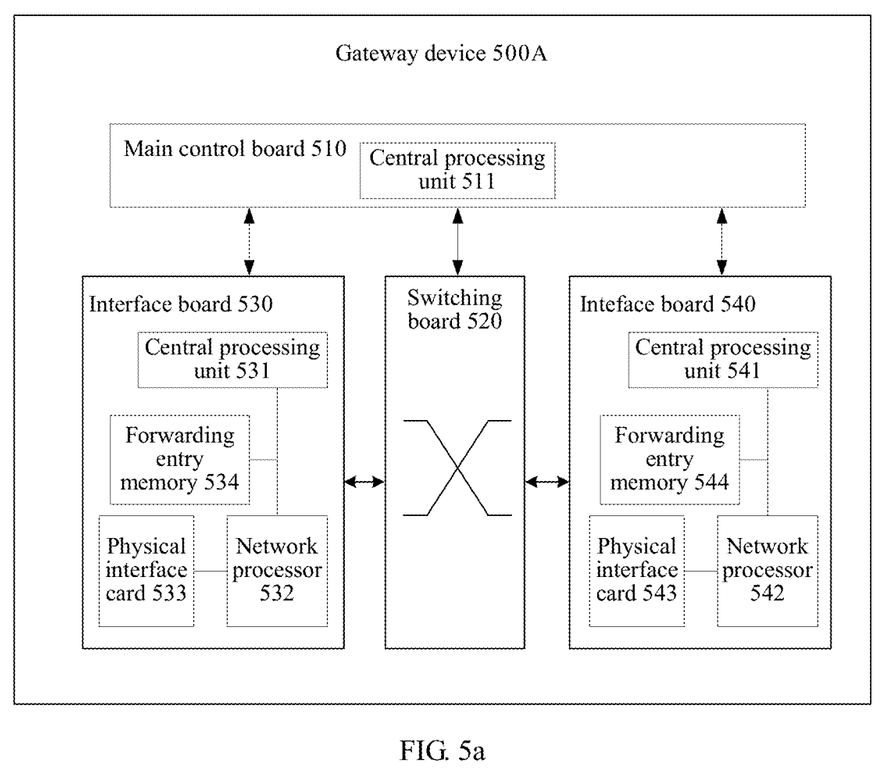
FIG. 5a is a schematic structural diagram of a gateway device according to an embodiment of the application.

FIG. 5a shows a possible schematic structural diagram of the gateway device in the foregoing embodiments. A gateway device 500A includes a main control board 510, an interface board 530, a switching board 520, and an interface board 540. The main control board 510 is configured to implement functions such as system management, device maintenance, and protocol processing. The switching board 520 is configured to implement data exchange between interface boards (an interface board is also referred to as a line board or a service board). The interface board 530 and the interface board 540 are configured to provide various service interfaces (for example, a POS interface, a GE interface, and an ATM interface), and implement data packet forwarding. The main control board 510, the interface board 530 and the interface board 540, and the switching board 520 are connected to a system backplane by using a system bus to implement interworking with each other. A central processing unit 531 on the interface board 530 is configured to perform control management on the interface board and communicate with a central processing unit 511 on the main control board 510.

The central processing unit 511 on the main control board 510 is configured to: obtain identification information of the gateway device, generate a message including the identification information of the gateway device, and deliver the message to the interface board 530 or the interface board 540. A destination IPv6 address that is included in an IPv6 packet header encapsulated in the message is an IPv6 address of a terminal device. A network processor 532 on the interface board 530 searches, according to the IPv6 address of the terminal device, a forwarding table (which stores an association relationship between an IPv6 address and an outbound interface) stored in a forwarding entry memory 534 to obtain a forwarding entry matching the IPv6 address of the terminal device, so as to further obtain an outbound interface 1 corresponding to the IPv6 address of the terminal device. The outbound interface 1 is located on a physical interface card 533. The physical interface card 533 is configured to send the message to the terminal device.

It should be understood that in an embodiment of the application, operations performed on the interface board 540 are consistent with those performed on the interface board 530. For brevity, details are not described again. It should be understood that the gateway device 500A in this embodiment may be corresponding to the gateway device in the embodiments corresponding to FIG. 3 to FIG. 4d. The main control board 510 and the interface board 530 and/or the interface board 540 of the gateway device 500A may implement functions of the gateway device and/or steps implemented by the gateway device in the embodiments corresponding to FIG. 3 to FIG. 4d. For brevity, details are not described herein again.

It should be noted that there may be one or more main control boards. When there are multiple main control boards, the main control boards may include a primary main control board and a secondary main control board. There may be one or more interface boards. A stronger data processing capability of the gateway device indicates a larger quantity of interface boards provided. There may also be one or more physical interface cards on an interface board. There may be no switching board, or there may be one or more switching boards. When there are multiple switching boards, load sharing or redundancy backup can be implemented. In a centralized forwarding architecture, the gateway device may not require the switching board, and the interface board undertakes service data processing of an entire system. In a distributed forwarding architecture, the gateway device may have at least one switching board, and use the switching board to implement data exchange between multiple interface boards and provide a capability of exchanging and processing large-capacity data. Therefore, a data access and processing capability of the gateway device in the distributed architecture is stronger than that in the centralized architecture. Which architecture is specifically used depends on a specific networking deployment scenario. No limitation is set thereto herein.

Figure 5B:
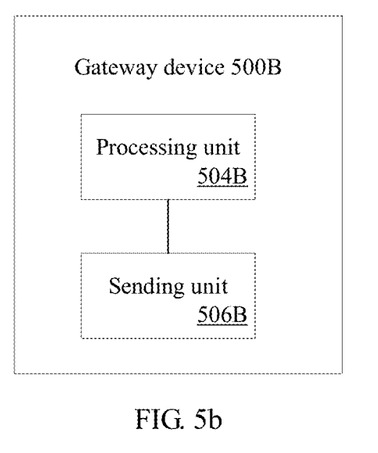
FIG. 5b is a schematic structural diagram of another gateway device according to an embodiment of the application.

FIG. 5b shows another possible schematic structural diagram of the gateway device in the foregoing embodiments. A gateway device 500B includes a processing unit 504B and a sending unit 506B.

The processing unit 504B is configured to obtain identification information of the gateway device 500B and generate a message. The message includes the identification information of the gateway device 500B.

The sending unit 506B is configured to send the message to the terminal device.

The gateway device 500B in an embodiment of the application may implement various functions of the gateway device and steps implemented by the gateway device in the embodiments corresponding to FIG. 3 to FIG. 5a. For brevity, details are not described herein again.

Figure 5C:
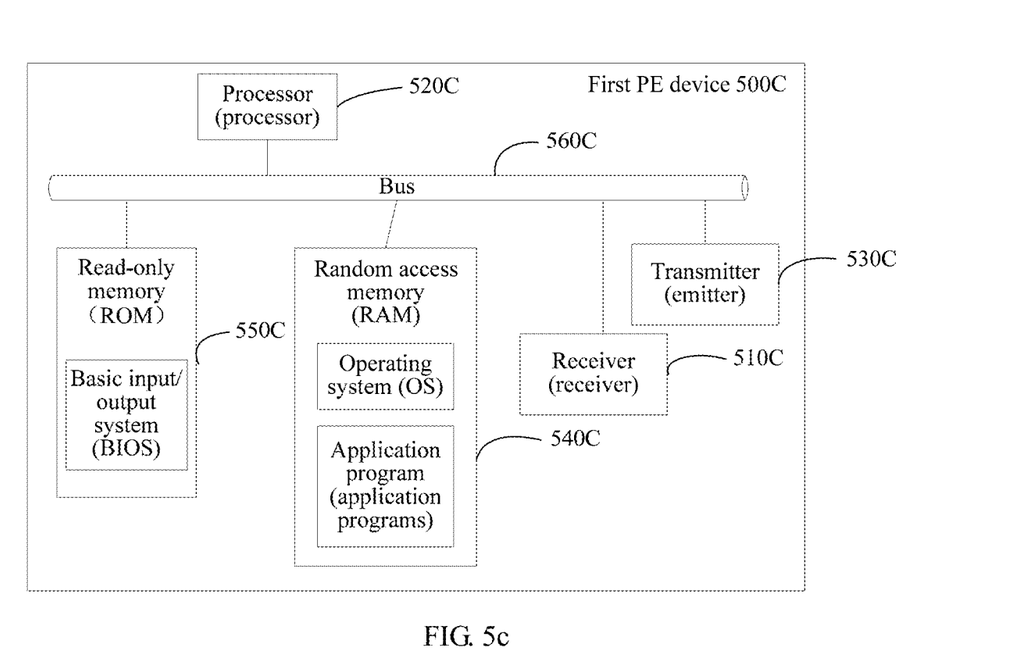
FIG. 5c is a schematic structural diagram of still another gateway device according to an embodiment of the application.

FIG. 5c shows still another possible schematic structural diagram of the gateway device in the foregoing embodiments. A gateway device 500C includes a receiver 510C, a processor 520C, a transmitter 530C, a random access memory 540C, a read-only memory 550C, and a bus 560C. The processor 520C is coupled to all of the receiver 510C, the transmitter 530C, the random access memory 540C, and the read-only memory 550C by using the bus 560C. When it is required to run the gateway device 500C, starting is performed by using a basic input/output system built in the read-only memory 550C or by using a bootloader boot system in an embedded system, to boot the gateway device 500C to a normal running state. After the gateway device 500C enters a normal running state, an application and an operating system run in the random access memory 540C. In this case, the processor 520C is configured to obtain identification information of the gateway device 500C and generate a message, where the message includes the identification information of the gateway device 500C; and the transmitter 530C is configured to send the message to the terminal device.

The gateway device 500C in an embodiment of the application may be corresponding to the gateway device in the embodiments corresponding to FIG. 3 to FIG. 4d. In addition, the processor 520C, the transmitter 530C, and the like of the gateway device 500C may implement functions of the gateway device and/or steps and methods implemented by the gateway device in the embodiments corresponding to FIG. 3 to FIG. 4d. The processor 520C is configured to perform all operations of the processing unit 504B of the gateway device in FIG. 5b, and the transmitter 530C is configured to perform all operations of the sending unit 506B of the gateway device in FIG. 5b. For brevity, details are not described herein again.

It should be noted that this embodiment may alternatively be based on a gateway device that is implemented by using a general physical server in combination with a network function virtualization NFV technology. The gateway device is a virtual gateway (for example, a virtual router or a virtual switch). The virtual gateway device may be a virtual machine (VM) on which a program used for gateway device selection is running, and the virtual machine is deployed on a hardware device (for example, a physical server). The virtual machine is a complete software-simulated computer system that has complete hardware system functions and that runs in a completely isolated environment. By reading this application, a person skilled in the art can virtualize, on a general physical server by using the NFV technology, multiple gateway devices having the foregoing functions. Details are not described herein.

Figure 6A:
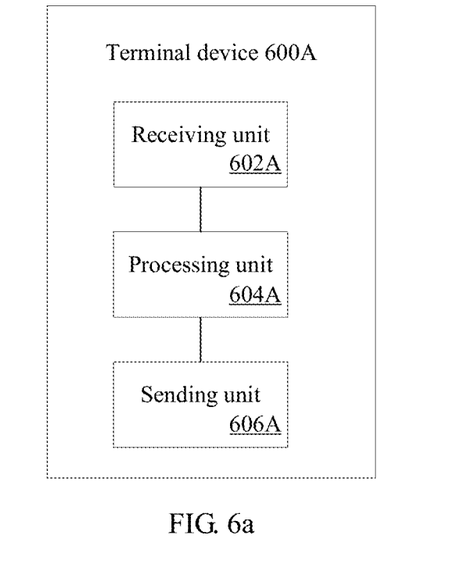
FIG. 6a is a schematic structural diagram of a terminal device according to an embodiment of the application.

FIG. 6a shows a possible schematic structural diagram of the terminal device in the foregoing embodiments. A terminal device 600A includes a processing unit 604A and a receiving unit 602A.

The receiving unit 602A is configured to receive a message from a gateway device, where the message includes identification information of the gateway device, and the identification information of the gateway device indicates information about the gateway device.

The processing unit 604A is configured to determine that the identification information of the gateway device is consistent with preset identification information of a gateway device on the terminal device, and use the gateway device as a selected gateway device.

The sending unit 606A is configured to send a data packet to the selected gateway device.

The terminal device 600A in an embodiment of the application may implement various functions of the terminal device and steps implemented by the terminal device in the embodiments corresponding to FIG. 1 to FIG. 3. For brevity, details are not described herein again.

Figure 6B:
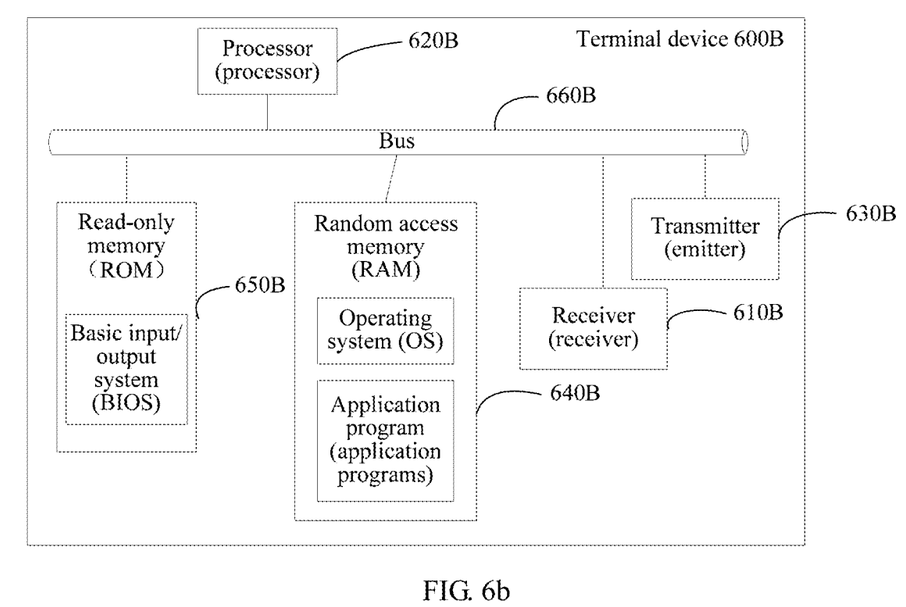
FIG. 6b is a schematic structural diagram of another terminal device according to an embodiment of the application.

FIG. 6b is another possible schematic structural diagram of the terminal device in the foregoing embodiments. A terminal device 600B includes a receiver 610B, a processor 620B, a transmitter 630B, a random access memory 640B, a read-only memory 650B, and a bus 660B. The processor 620B is coupled to all of the receiver 610B, the transmitter 630B, the random access memory 640B, and the read-only memory 650B by using the bus 660B. When it is required to run the terminal device 600B, starting is performed by using a basic input/output system built in the read-only memory 650B or by using a bootloader boot system in an embedded system, to boot the terminal device 600B to a normal running state. After the terminal device 600B enters a normal running state, an application and an operating system run in the random access memory 640B. In this case, the receiver 610B is configured to receive a message from a gateway device, where the message includes identification information of the gateway device, and the identification information of the gateway device indicates information about the gateway device; the processor 620B is configured to determine that the identification information of the gateway device is consistent with preset identification information of a gateway device on the terminal device, and use the gateway device as a selected gateway device; and the transmitter 630B is configured to send a data packet to the selected gateway device.

The terminal device 600B in an embodiment of the application may be corresponding to the terminal device in the embodiments corresponding to FIG. 3 to FIG. 4d. In addition, the processor 620B, the transmitter 630B, and the like of the terminal device 600B may implement functions of the terminal device and/or steps and methods implemented by the terminal device in the embodiments corresponding to FIG. 3 to FIG. 4d. The processor 620B is configured to perform all operations of the processing unit 604A of the terminal device in FIG. 6a. The receiver 610B is configured to perform all operations of the receiving unit 602A of the terminal device in FIG. 6a. The transmitter 630B is configured to perform all operations of the sending unit 606A of the terminal device in FIG. 6a. For brevity, details are not described herein again.

Figure 7:
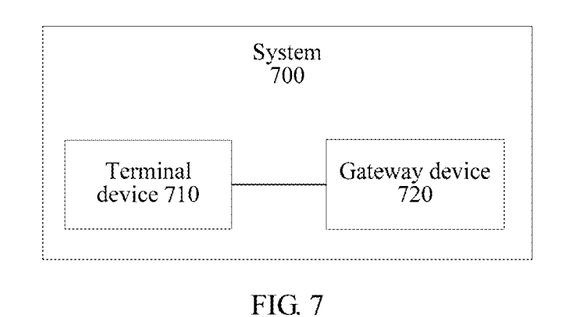
FIG. 7 is a schematic diagram of a network system according to an embodiment of the application.

FIG. 7 is a schematic diagram of a gateway device selection system 700 according to an embodiment of the application. As shown in FIG. 7, the system 700 includes a terminal device 710 and a gateway device 720. The terminal device 710 is any terminal device in FIG. 6a and FIG. 6b. The gateway device 720 is any gateway device or virtual gateway device in FIG. 5a, FIG. 5b, and FIG. 5c. For detailed descriptions about the devices in the system, refer to related sections corresponding to FIG. 5a to FIG. 5c, FIG. 6a to FIG. 6b, and the like, and details are not described herein again.

It should be understood that based on reading of this application document, a person skilled in the art may make combinations of optional features, steps, or methods described in the embodiments of this application, without creative efforts. These all fall within the embodiments disclosed in this application, although different combinations are not repeated for ease of description or wording.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of present invention. The execution sequences of the processes should be determined according to functions and internal logic of the processes, and should not be construed as any limitation on the implementation processes of the embodiments of present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely some implementations in accordance with the present disclosure, and thus are not intended to limit the protection scope of the present disclosure. Any variation or replacement readily figured out by a person skilled in the art within the technical scope disclosed herein shall fall within the protection scope of present disclosure. Therefore, the protection scope of the present disclosure shall be subject to the protection scope of the claims.

What is claimed is:

1. A gateway device selection method, the method comprising:
   receiving, by a terminal device, a first message from a first gateway device of a plurality of gateway devices, wherein the first message comprises a first identification information of the first gateway device, wherein the first gateway device is coupled to a first network;
   determining, by the terminal device, that the first identification information of the first gateway device is consistent with preset identification information of a preset gateway device on the terminal device, and using the first gateway device as a selected gateway device; and
   sending, by the terminal device, a data packet to the selected gateway device,
   wherein the first message is a router advertisement (RA) message, the RA message comprises an option field, and the option field carries the first identification information of the first gateway device,
   wherein the first identification information of the first gateway device comprises a service type of a network accessed by the first gateway device or information about a network to which the first gateway device belongs,
   the method further comprising:
   receiving, by the terminal device, a second message from a second gateway device of the plurality of gateway devices, wherein the second message comprises a second identification information of the second gateway device, and wherein the second gateway device is coupled to a second network different from the first network; and
   determining, by the terminal device, that the second identification information of the second gateway device is inconsistent with the preset identification information of the preset gateway device on the terminal device, and identifying the second gateway device as a gateway device to which data cannot be sent,
   wherein the terminal device, the first gateway device and the second gate way device are deployed in a same data link layer (layer 2) network, and the first message and the second message enables the terminal device to select a gateway device to which the data can be sent.

2. The method according to claim 1, wherein the option field comprises a type field, a length field, and a value field,
   wherein the type field indicates that a type of the option field advertises the identification information of the first gateway device,
   wherein the length field indicates a length of the option field or a length of the value field, and
   wherein the value field indicates the first identification information of the first gateway device.

3. The method according to claim 1, wherein the plurality of gateways devices are coupled to different networks that are operated or owned by different service providers.

4. The method according to claim 1, wherein the first identification information is provided to the first gateway device by a network administrator or the first identification information is automatically generated by the first gateway device.

5. The method according to claim 1, comprising:
   determining, by the terminal device, that the first identification information of the first gateway device is inconsistent with the preset identification information of the preset gateway device on the terminal device, and identifying the first gateway device as a gateway device to which data cannot be sent.

6. The method according to claim 1, wherein the option field of the RA comprises a source link-layer address, a target link-layer address, a prefix information, a redirected header, a maximum transmission unit, a route information and a router identifier.

7. The method according to claim 1, wherein differentiation of gateway devices belonging to different networks is further supported by subdividing an identification information of a gateway device.

8. A terminal device, comprising:

a memory configured to store instructions; and one or more processors coupled to the memory and configured to execute the instructions to:

receive a first message from a first gateway device of a plurality of gateway devices, wherein the first message comprises first identification information of the first gateway device, and wherein the first gateway device is coupled to a first network;

determine that the first identification information of the first gateway device is consistent with preset identification information of a preset gateway device on the terminal device, and use the first gateway device as a selected gateway device; and send a data packet to the selected gateway device, wherein the first message is a router advertizement (RA) message, the RA message comprises an option field, and the option field carries the first identification information of the first gateway device, wherein the first identification information of the first gateway device comprises a service type of a network accessed by the first gateway device or information about a network to which the first gateway device belongs, wherein the one or more processors are further configured to execute the instructions to:

receive a second message from a second gateway device of the plurality of gateway devices, wherein the second message comprise second identification information of the second gateway device, and wherein the second gateway device is coupled to a second network different from the first network; and determine that the second identification information of the second gateway device is inconsistent with the preset identification information of the preset gateway device on the terminal device, and identify the second gateway device as a gateway device to which data cannot be sent, wherein the terminal device, the first gateway device and the second gate way device are deployed in a same data link layer (layer 2) network, and the first message and the second message enables the terminal device to select a gateway device to which the data can be sent.

9. The terminal device according to claim 8, wherein the option field comprises a type field, a length field, wherein a value field indicates that a type of the option field advertises the first identification information of the first gateway device, wherein the length field indicates a length of the option field or a length of the value field, and wherein the value field indicates the first identification information of the first gateway device.

10. The terminal device according to claim 8, wherein the one or more processors further execute the instructions to:

determine that the first identification information of the first gateway device is inconsistent with preset identification information of the preset gateway device on the terminal device, and identify the first gateway device as a gateway device to which data cannot be sent.

* * * * *